US009300819B2

(12) United States Patent
Roger

(10) Patent No.: US 9,300,819 B2
(45) Date of Patent: Mar. 29, 2016

(54) COMMUNICATION DEVICE

(75) Inventor: Michael Roger, Biot (FR)

(73) Assignee: Advanced Messaging Technologies, Inc., Los Angeles, CA (US)

( * ) Notice: Subject to any disclaimer, the term of this patent is extended or adjusted under 35 U.S.C. 154(b) by 841 days.

(21) Appl. No.: 12/993,842

(22) PCT Filed: May 19, 2009

(86) PCT No.: PCT/FR2009/050925
§ 371 (c)(1),
(2), (4) Date: Feb. 14, 2011

(87) PCT Pub. No.: WO2009/150362
PCT Pub. Date: Dec. 17, 2009

(65) Prior Publication Data
US 2011/0134478 A1    Jun. 9, 2011

(30) Foreign Application Priority Data

May 20, 2008  (FR) ..................................... 08 53256

(51) Int. Cl.
*H04N 1/00* (2006.01)
*H04N 1/32* (2006.01)
(52) U.S. Cl.
CPC ......... *H04N 1/00214* (2013.01); *H04N 1/0022* (2013.01); *H04N 1/00212* (2013.01); *H04N 1/32106* (2013.01); *H04N 2201/0093* (2013.01); *H04N 2201/3209* (2013.01); *H04N 2201/3274* (2013.01)
(58) Field of Classification Search
None
See application file for complete search history.

(56) References Cited

U.S. PATENT DOCUMENTS

| 5,671,251 | A  | * | 9/1997 | Blackwell | ........... H04L 12/2856 |
| | | | | | 370/385 |
| 6,559,964 | B1 | * | 5/2003 | Tsukamoto | .......... G06Q 10/107 |
| | | | | | 358/1.15 |
| 2002/0036792 | A1 | * | 3/2002 | Murphy | .................. G06F 17/21 |
| | | | | | 358/1.15 |
| 2002/0069254 | A1 | * | 6/2002 | Watanabe | ............... H04L 51/28 |
| | | | | | 709/206 |
| 2002/0114439 | A1 | * | 8/2002 | Dunlap | ............. H04L 29/06027 |
| | | | | | 379/219 |

(Continued)

FOREIGN PATENT DOCUMENTS

EP           1841175 A1    10/2007    .............. H04L 29/06

OTHER PUBLICATIONS

Internation PCT Search Report, PCT/FR2009/050925, 2 pages.

*Primary Examiner* — Hilina K Demeter
(74) *Attorney, Agent, or Firm* — Blakely Sokoloff Taylor & Zafman LLP

(57) ABSTRACT

The communication device has:
a first communication transceiver for transmitting and receiving communication with a first facsimile machine via an analogue link;
a second communication transceiver for transmitting and receiving communication with a digital communication network via a digital link;
a converter to convert an analogue signal to a digital signal;
a memory adapted to store the telephone number of a second, remote, facsimile machine receiving a fax to be transmitted, and to store in memory a digital data file corresponding to the conversion of a fax in analogue form into a digital file by the converter; and
an electronic controller having a first simulator simulating an analogue telephone network, a second simulator simulating the second facsimile machine ready to receive a fax, and a forwarding device to forward digital data via the digital communication network which contain the digital file corresponding to the fax.

20 Claims, 1 Drawing Sheet

(56) References Cited

U.S. PATENT DOCUMENTS

| | | | |
|---|---|---|---|
| 2002/0154341 A1 | 10/2002 | Rollins | 358/407 |
| 2005/0047422 A1 | 3/2005 | Chen et al. | 370/401 |
| 2005/0190404 A1* | 9/2005 | Nakamura | H04N 1/00209 358/1.15 |
| 2007/0189266 A1* | 8/2007 | Izumi et al. | H04N 1/00214 370/352 |

* cited by examiner

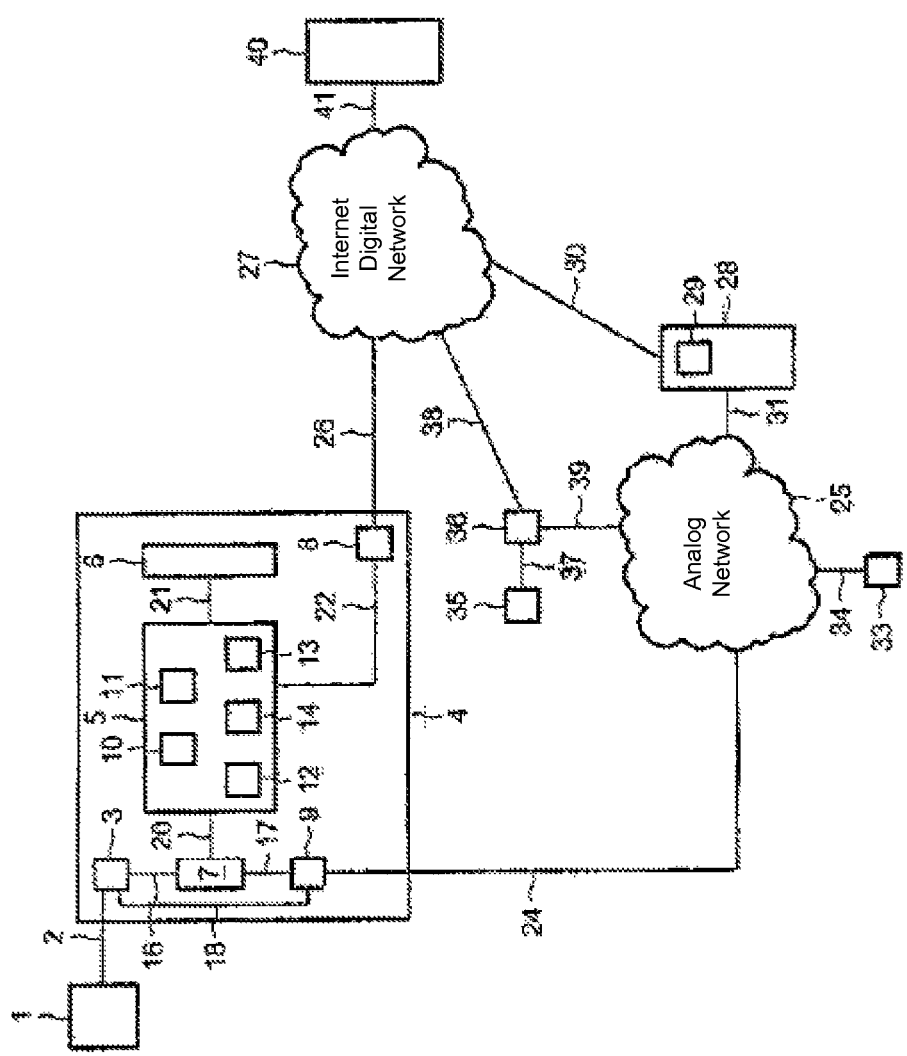

COMMUNICATION DEVICE

CROSS-REFERENCE TO RELATED APPLICATIONS

This application is a U.S. National Stage Application of International Application No. PCT/FR2009/050925 filed May 19, 2009, which designates the United States of America, and claims priority to French Application No. 0853256 filed May 20, 2008. The contents of which are hereby incorporated by reference in their entirety.

TECHNICAL FIELD

The present invention concerns a communication device, and more particularly a communication device for facsimile machine.

BACKGROUND

Facsimile machines, commonly called "fax" machines, communicate via an analogue communication network commonly called a "public switched telephone network" (PSTN).

A facsimile machine can be used to transmit an analogue signal representing a document printed on paper, via an analogue communication network, to another remote facsimile machine which is able to transcribe onto paper a copy of the document transmitted or faxed by the first facsimile machine.

However, with the development of IP telephony, or in other words of digital communication networks, a problem of compatibility arises. In fact, existing facsimile machines, designed to use an analogue communication network, cannot function on digital communication networks.

SUMMARY

According to various embodiments, facsimile machines can be enabled, initially designed to function on an analogue telecommunications network, to function on a digital communication network.

According to further embodiments, facsimiles (faxes) that are transmitted or received by a facsimile machine can be archived in digital form, automatically.

BRIEF DESCRIPTION OF THE DRAWINGS

FIG. 1 shows an embodiment of a system using analog facsimile machines.

DETAILED DESCRIPTION

Therefore, according to one aspect, a communication device is proposed comprising first communication means for transmit and receive communication with a first facsimile machine via an analogue link, and second communication means for transmit and receive communication with a digital communication network via a digital link. The device also comprises means to convert an analogue signal to a digital signal, and memory means adapted to store in memory the telephone number of a second, remote facsimile machine receiving a fax to be transmitted, and to store in memory a digital data file corresponding to the conversion of a fax in analogue form to a digital file by said conversion means. The device further comprises electronic control means comprising first simulation means to simulate an analogue telephone network, second simulation means to simulate said second facsimile machine ready to receive a fax, and forwarding means to forward digital data via the digital communication network, this data containing said digital file corresponding to the fax.

With said device, an existing facsimile machine designed to function on an analogue communication network, can be used on a digital communication network at reduced cost.

According to one embodiment, said digital data file sent by said forwarding means over the digital communication network further contains said telephone number of said second facsimile machine.

The telephone number of the second facsimile machine allows identification of the remote facsimile machine to which the fax is to be transmitted.

In one embodiment, said digital data file sent by said forwarding means over the digital communication network further comprises an identifier representing said device.

This identifier will allow consideration to be given to the desiderata of the owner of the communication device associated with this identifier.

According to one embodiment, said control means further comprise means to receive digital data via the digital communication network.

Therefore, the device is also capable of receiving digital data, such as digital data representing a fax, or an electronic mail which can be printed in fax form.

According to one embodiment, the device further comprises third communication means to receive a fax in analogue form sent by said second remote facsimile machine, via an analogue communication network, and to transmit said fax in analogue form to said first facsimile machine by said first communication means.

According to one embodiment, said third communication means are adapted for the transmission in analogue form of said fax received in analogue form, towards said conversion means converting an analogue signal to a digital signal and towards said first communication means.

According to one embodiment, said control means further comprise means to encipher the digital data transmitted by said forwarding means.

It is therefore possible to encipher or encrypt the data sent by the communication device, and to protect their content.

According to one embodiment, said enciphering means are further adapted to decipher enciphered digital data received by said receiver means.

The enciphering means can then also decipher enciphered digital data received by the communication device.

According to another aspect, there is also proposed a communication system comprising a device such as described above and a server connected to said digital communication network. Said forwarding means of the communication device are adapted to send digital data to said server.

According to one embodiment, said server comprises communication means for transmit communication with said analogue communication network, and communication means for transmit and receive communication with said digital communication network.

According to one embodiment, said server is adapted to transmit a file of electronic data to an electronic address via said digital communication network.

According to one embodiment, said server comprises a database adapted to match a telephone number with at least one electronic address and/or at least one other telephone number of a facsimile machine and/or at least one identifier of a communication device.

Therefore, any fax transmitted by the communication device can be transmitted as a copy to a list of facsimile machines and/or to a list of electronic addresses, as desired by the owner of the communication device connected to the facsimile machine transmitting the fax, and optionally as desired by the owner of said device if the receiving facsimile machine is provided with such device.

According to one embodiment, said database is further adapted to match an identifier representing said device with at least one electronic address and/or at least one other facsimile machine telephone number.

Other objects, characteristics and advantages of the invention will become apparent on reading the following description of some examples which are in no way limiting, with reference to the appended drawings illustrating an example of embodiment of a communication system comprising a device according to one aspect of the invention.

Such as illustrated in the FIGURE, a facsimile machine 1 is connected via an analogue link 2 to an analogue connector 3 e.g. of RJ11 type, of a communication device 4. Evidently, it can easily be considered that the analogue connector RJ11 may be replaced by a conventional telephone plug for example. The facsimile machine 1 can therefore transmit an analogue signal, representing a fax, to the communication device 4 via the analogue link 2.

The communication device 4 is also provided with a control module 5, a volatile memory e.g. of Random Access Memory (RAM) type, an analogue/digital modem 7 used to convert an analogue signal to a digital signal, and a digital connector e.g. of RJ45 type. The communication device 4 is also provided with another optional analogue connector 9 e.g. of RJ11 type which, as a variant, can be replaced by a conventional telephone plug.

The control module 5 comprises a first simulation module 10 used to simulate an analogue telephone network, and a second simulation module 11 used to simulate a facsimile machine ready to receive a fax. A facsimile machine transmitting a fax via an analogue network such as the PSTN must, before it sends a fax, receive an invitation from the analogue network to dial the number of the receiving facsimile machine, followed by an indication that a communication pathway is reserved between the transmitting facsimile machine and the receiving facsimile machine. A dial invitation is a signal transmitted by the analogue network to the transmitting facsimile machine, indicating that dialing of the number of the receiving facsimile machine can be initiated. Next, when this receiving machine is ready to receive data, it transmits a signal to the transmitting facsimile machine indicating that transmission of the fax can be initiated.

The control module 5 further comprises a forwarding module 12 allowing the transmission of digital data, and a receiver module 13 allowing the reception of digital data. The control module 5 further comprises an enciphering module 14 used to encipher or encrypt digital data transmitted by the forwarding module 12. The enciphering module 14 is further adapted to decipher or decrypt enciphered or encrypted data received by the receiver means 13.

Analogue links 16, 17 and 18 respectively link the analogue connector 3 and the analogue/digital modem 7, the analogue/digital modem 7 and the analogue connector 9, and the analogue connector 9 and the analogue connector 3. Digital links 20, 21 and 22 respectively link the analogue/digital modem 7 and the control module 5, the control module 5 and the volatile memory 6, and the control module 5 and the digital connector 8.

The analogue connector 9, via an analogue link 24, allows analogue data to be received representing faxes transmitted via an analogue network 25, and the digital connector 8, via a digital link 26, allows data to be exchanged with the Internet digital network 27. A server 28, provided with a database 29 adapted to match a telephone number with at least one electronic address and/or at least one other facsimile machine telephone number, is adapted to communicate with the Internet digital network 27 via a digital link 30, and to communicate with the analogue network 25 via a digital link 30, and to communicate with the analogue network 25 via an analogue link 31. Therefore, any fax transmitted by the facsimile machine 1 can be transmitted to a list of other facsimile machines and/or to electronic mailboxes automatically, for example to an electronic address at which all faxes are saved.

Additionally, the control module 5 is adapted to scan or consult at regular intervals the content of an electronic mailbox corresponding to a pre-determined electronic address, and to have transmitted by the server 28 a fax copy of an electronic mail received in this electronic mailbox, via the analogue network 25 to the facsimile machine 1.

Another facsimile machine 33 can be connected to the analogue network via an analogue link 34, and another facsimile machine 35 is connected to a communication device 36 similar to the communication device 4, via an analogue connection 37. The communication device 36 communicates with the Internet digital network 27 via a digital link 38, and with the analogue network 25 via an analogue link 39. Also, a server 40 hosting electronic mailboxes is connected to the Internet digital network 27 via a digital link 41.

When the facsimile machine 1 attempts to transmit a fax to a remote facsimile machine, the first simulation module 10 simulates an analogue telephone network, and notably a dial invitation which corresponds to a signal indicating to the facsimile machine 1 that it can dial the number corresponding to the facsimile machine to which the fax is to be sent, which in an analogue network of PSTN type allows a communication pathway to be reserved between the two facsimile machines for the duration of the data exchange.

In addition, the second simulation module 11 simulates the remote facsimile machine ready to receive the fax, by transmitting to facsimile machine 1 a signal that is identical to the signal that the remote facsimile machine would send via the analogue network of PSTN type, to indicate to facsimile machine 1 that it can transmit the analogue signal representing the fax to be transmitted. The facsimile machine 1 then emits an analogue signal corresponding to the fax to be sent, transmitted via the analogue links 2 and 16 to the analogue/digital modem 7 which converts this analogue signal into a sequence of digital data transmitted via the digital link 20 to the control module 5, and stored in the form of a digital data file in the volatile memory 6 via the digital link 21.

The forwarding module 1 then transmits the digital data file corresponding to the fax to be transmitted, over the Internet digital network 27 via digital links 22 and 26, to the server 28 connected to the Internet digital network 27 via the digital link 30. The data file also comprises the telephone number dialed by the facsimile machine 1, hence the server 28 is able to transmit over the analogue network 25 an analogue signal corresponding to the fax to be sent, to the facsimile machine 33 corresponding to the telephone number attached to the file, if this telephone number is not given in the database 29.

On the other hand, if this telephone number is given in the database 29, the server 28 can, for example via the digital network 27 transmit a digital copy of the fax to the server 40 comprising an electronic mailbox corresponding to an electronic address provided by the database 29 matching the telephone number of the facsimile machine 33. Said facsimile machine can effectively be provided with a similar communication device to the communication device 4, capable of scanning at least one electronic mailbox corresponding to an electronic address, and of printing the digital copy of the fax in facsimile form.

The control module 5 can also attach an identifier, representing the communication device 4, with the digital data file sent by the forwarding module 12. This identifier number representing the communication device 4 enables the server 28 to manage several possible options, determined by the owner of the communication device 4 and integrated in the database 29. For example, if one or more electronic addresses and/or one or more facsimile machine telephone numbers and/or one or more identifiers representing communication devices similar to communication device 4 correspond to this identifier, then the server 28 can send electronic copies of the fax to the different corresponding electronic addresses, and can transmit the fax to the different corresponding remote facsimile machines over the analogue network.

When a remote facsimile machine transmits a fax to the facsimile machine 1, via the analogue network 25, the analogue signal representing this fax is transmitted to the communication device 4 via the analogue connection 24, then to the facsimile machine 1 via the analogue links 18 and 2. Therefore, the facsimile machine 1 can receive a fax via the analogue network 25. In addition, this fax in analogue form can be transmitted to the analogue/digital modem 7 via the analogue link 17, so that the analogue/digital modem 7 can digitize this fax and the control module 5, via the forwarding module 12, can transmit an electronic version of this fax to an electronic address via the Internet digital network 27, either directly or via the server 28, to save received faxes.

Additionally, by means of the database 29, the server 28 is able to scan an electronic mailbox corresponding to an electronic address, related to an identifier representing a communication device such as 4, and when a new electronic mail arrives in this mailbox it can send a copy thereof in analogue form via the analogue network 25 to the corresponding communication device which transmits the same to the facsimile machine with which it is connected.

The modules contained in the control module 5 can be fabricated in the form of integrated circuits or in software form.

Consequently, numerous advantages are offered and notably the advantage that an existing facsimile machine, designed to operate on an analogue network e.g. a public switched telephone network, can be used on a digital network, at reduced cost.

It is additionally possible to save faxes transmitted and received in digital form in an electronic mailbox, thereby allowing the digital archiving of faxes or the consulting of faxes received by a facsimile machine, even remotely when travelling by consulting the electronic mailbox.

It is further possible, when a facsimile machine provided with said communication device receives a fax, to transfer this fax to one or more remote facsimile machines or to one or more electronic addresses, automatically.

What is claimed is:

1. A communication device comprising:
    a first communication transceiver configured to transmit and receive communications with a first analog facsimile machine via an analog link;
    a second communication transceiver configured to transmit and receive communications with a digital communication network via a digital link;
    a converter configured to receive from the first analog facsimile machine, via the analog link, an analog signal corresponding to a fax to be transmitted and convert the received analog signal corresponding to the fax to be transmitted by the first analog facsimile machine to a digital signal;
    a memory configured to store a telephone number of a remote, second analog facsimile machine selected to receive the fax to be transmitted by the first analog facsimile machine, and to store a digital data file corresponding to an analog-to-digital conversion by the converter of the fax;
    a forwarding device configured to forward digital data, via the digital communication network, containing said digital data file corresponding to the fax, and
    an electronic controller comprising:
        a first simulator configured to simulate an analog telephone network by generating and sending an analog dial invitation signal to the first analog facsimile machine via the analog link, the analog dial invitation signal generated by the first simulator comprising a simulation of a public switched telephone network (PSTN) signal that indicates to the first analog facsimile machine that the first analog facsimile machine can dial the telephone number of said second analog facsimile machine; and
        a second simulator configured to simulate said second analog facsimile machine being ready to receive a fax by generating and sending a ready signal to the first analog facsimile machine without the second analog facsimile machine generating the ready signal, via the analog link, the ready signal generated by the second simulator comprising a simulation of a signal generated by said second analog facsimile machine that indicates that the first analog facsimile machine can transmit the analog signal corresponding to the fax to be transmitted.

2. The communication device according to claim 1, wherein said digital data file sent by said forwarding device over the digital communication network further comprises said telephone number of said second analog facsimile machine.

3. The communication device according to claim 1, wherein said digital data file sent by said forwarding device over the digital communication network further comprises an identifier representing said communication device.

4. The communication device according to claim 1, wherein said electronic controller further comprises a receiver configured to receive digital data via the digital communication network.

5. The communication device according to claim 1, further comprising a third communication transceiver configured to receive, via an analog communication network, a fax in analog form transmitted by said remote second analog facsimile machine and to transmit said fax in analog form to said first analog facsimile machine via said first communication transceiver.

6. The communication device according to claim 5, wherein said third communication transceiver is adapted to transmit, in analog form, said fax received in analog form towards said converter converting an analog signal to a digital signal, and towards said first communication transceiver.

7. The communication device according to claim 1, wherein said electronic controller further comprises an enciphering module configured to encipher digital data transmitted by said forwarding device.

8. The communication device according to claim 7, wherein said enciphering module is further configured to decipher enciphered digital data received by a receiver of said electronic controller.

9. A communication system comprising:
a communication device comprising:
- a first communication transceiver configured to transmit and receive communications with a first analog facsimile machine via an analog link;
- a second communication transceiver configured to transmit and receive communications with a digital communication network via a digital link;
- a converter configured to convert an analog signal corresponding to a fax to be transmitted by the first analog facsimile machine to a digital signal;
- a memory configured to store a telephone number of a remote, second analog facsimile machine selected to receive the fax to be transmitted by the first analog facsimile machine, and to store a digital data file corresponding to an analog-to-digital conversion by the converter of the fax;
- a forwarding device configured to forward digital data, via the digital communication network, containing said digital data file corresponding to the fax, and
- an electronic controller comprising:
  - a first simulator configured to simulate an analog telephone network by generating and sending an analog dial invitation signal to the first analog facsimile machine via the analog link, the analog dial invitation signal generated by the first simulator comprising a simulation of a public switched telephone network (PSTN) signal that indicates to the first analog facsimile machine that the first analog facsimile machine can dial the telephone number of said second analog facsimile machine, and
  - a second simulator configured to simulate said second analog facsimile machine being ready to receive a fax by generating and sending a ready signal to the first analog facsimile machine without the second analog facsimile machine generating the ready signal, via the analog link, the ready signal generated by the second simulator comprising a simulation of a signal generated by said second analog facsimile machine that indicates that the first analog facsimile machine can transmit the analog signal corresponding to the fax to be transmitted, and
a server connected to said digital communication network, wherein said forwarding device of the communication device is configured to send digital data to said server.

10. The communication system according to claim 9, wherein said server comprises a communication transceiver configured to enable communication with said analog communication network, and a second communication transceiver configured to enable communication with said digital communication network.

11. The communication system according to claim 9, wherein said server is adapted to transmit a file of electronic data to an electronic address via said digital communication network.

12. The communication system according to claim 9, wherein said server comprises a database adapted to match a telephone number with at least one of: at least one electronic address, at least one other facsimile machine telephone number, and at least one identifier of a communication device.

13. The communication system according to claim 12, wherein said database is further adapted to match an identifier representing said communication device with at least one of: at least one electronic address and at least one other facsimile machine telephone number.

14. A method for transmitting a facsimile transmission (fax) from a first analog facsimile machine to a second analog facsimile machine remote from the first analog facsimile machine, the method comprising:
- simulating an analog receiving telephone network by a device coupled via an analog link to the first analog facsimile machine; including said device generating and sending an analog dial invitation signal to the first analog facsimile machine via the analog link, the analog dial invitation signal generated by the first simulator comprising a simulation of a public switched telephone network (PSTN) signal that indicates to the first analog facsimile machine that the first analog facsimile machine can dial the telephone number of said second analog facsimile machine;
- simulating said second analog facsimile machine being ready to receive a fax by the device coupled via the analog link to said first analog facsimile machine, including said device generating and sending a ready signal to the first analog facsimile machine without the second analog facsimile machine generating the ready signal, via the analog link, the ready signal generated by the second simulator comprising a simulation of a signal generated by said second analog facsimile machine that indicates that the first analog facsimile machine can transmit an analog signal corresponding to the fax;
- receiving a telephone number from said first analog facsimile machine by said device via the analog link;
- receiving the analog signal corresponding to the fax from said first analog facsimile machine by said device via the analog link;
- converting said received analog signal representing said fax into a digital file representing said fax by said device, and
- transmitting said digital file representing said fax via a digital network by said device.

15. The method according to claim 14, further comprising combining said telephone number into said digital file.

16. The method according to claim 14 wherein said digital data file further comprises an identifier representing said device.

17. The method according to claim 14, further comprising the step of enciphering digital data stored in said digital file.

18. The method according to claim 14, further comprising the step of deciphering enciphered digital data received by said device.

19. The method according to claim 14, wherein the step of transmitting said first fax via a digital network comprises transmitting said first fax to a server.

20. The method according to claim 19, wherein said server transmits a file of electronic data to an electronic address via said digital network.

* * * * *